June 24, 1958 N. C. BRODDON 2,840,288
ARTICLE HOLDER FOR TRUCK RACK
Filed Sept. 23, 1955
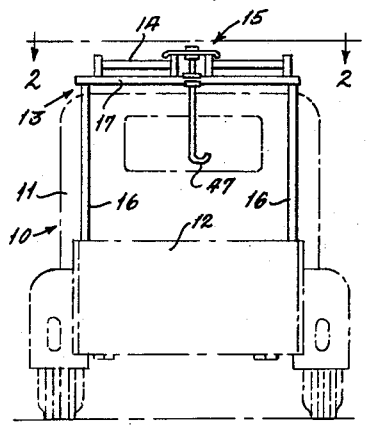
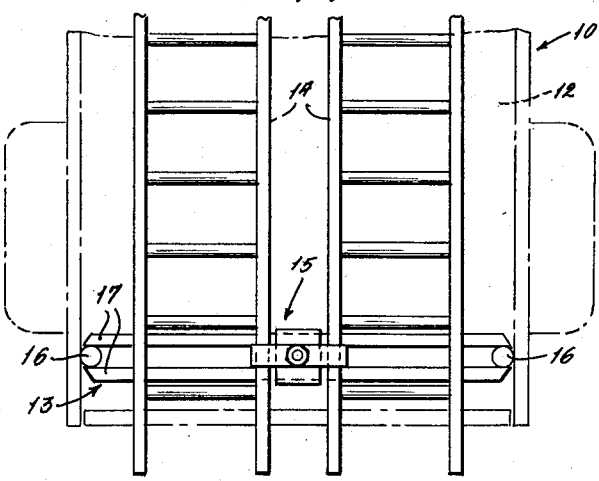
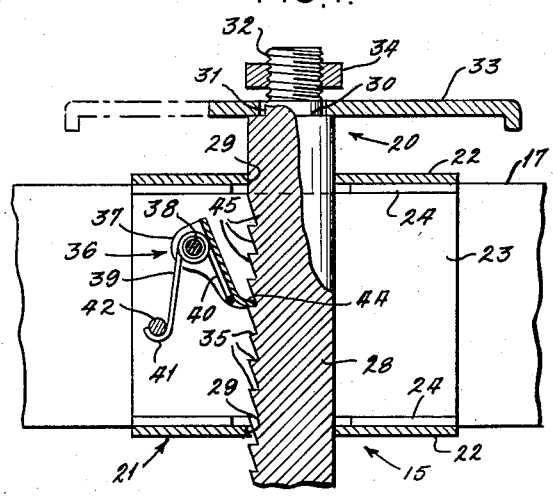
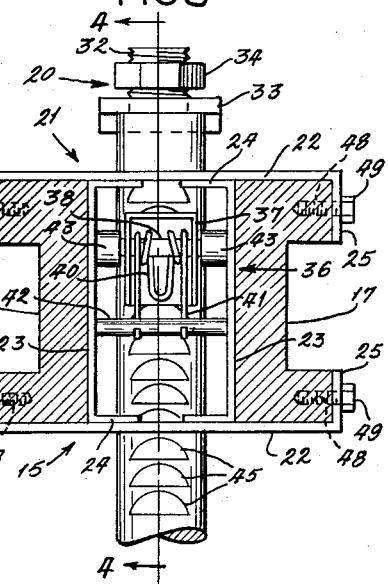
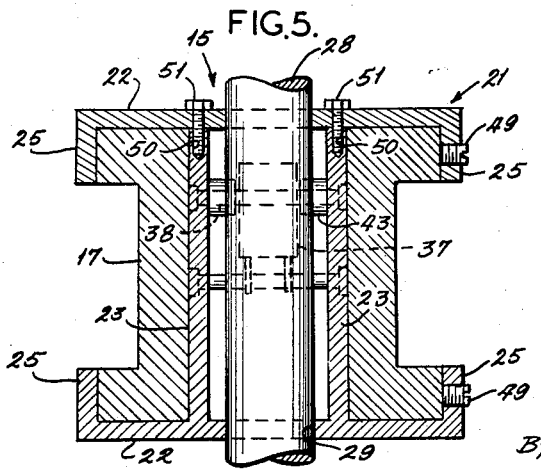
INVENTOR:
NORMAN C. BRODDON
By Gravely, Lieder, Woodruff & Wills
ATTORNEYS.

2,840,288

ARTICLE HOLDER FOR TRUCK RACK

Norman C. Broddon, St. Louis, Mo.

Application September 23, 1955, Serial No. 536,146

5 Claims. (Cl. 224—42.1)

This invention relates generally to article carriers and supports and more particularly to an article holder for a truck rack or the like.

One of the objects of the present invention is to provide a clamp-type holder for releasably securing various articles, such as ladders, lumber, pipes or the like, to a truck rack or on other suitable supporting surfaces of the truck.

Another object is to provide a holder which will firmly lock articles in place on a truck rack so that rattling or accidental displacement therefrom is prevented, the holder being quickly and easily released from locking engagement with the articles for removing the articles from the rack.

Another object is to provide a holder adapted to secure articles of different thicknesses and widths on a truck, the holder being simple and rugged in construction and economically manufactured.

These and other objects and advantages will become apparent hereinafter.

Briefly, the invention is embodied in a holder for a truck rack, the holder including a vertically adjustable member having clamp means rotatably mounted on its upper end and ratchet means adapted to engage the vertical member along one side to releasably lock the clamp means in article engaging position on the rack.

The invention also consists in the parts and in the arrangements and combinations of parts hereinafter described and claimed. In the accompanying drawings which form a part of this specification and wherein like numerals refer to like parts wherever they occur:

Fig. 1 is an end view of a truck showing a holder embodying the present invention mounted thereon, Fig. 2 is a fragmentary top plan view of the truck and holder taken substantially along line 2—2 of Fig. 1.

Fig. 3 is a greatly enlarged elevational view of the holder,

Fig. 4 is a cross-sectional view of the holder taken along line 4—4 of Fig. 3, and Fig. 5 is a greatly enlarged sectional view of a modified holder.

For purposes of disclosure, a truck 10 is shown in phantom lines in Figs. 1 and 2 and includes a driver's cab 11 and a body portion 12 extending to the rear of the cab 11. The truck 10 is provided with racks 13 at the front and rear of the body portion 12 on which ladders, lumber, pipe or other articles 14 may be carried. An article holder 15 constructed in accordance with the teachings of the present invention is shown positioned on the rear rack 13, which includes vertical members 16 secured to opposite sides of the body portion 12 and a pair of spaced horizontal rail members 17 secured to the upper ends of the vertical members 16. As will become apparent hereinafter, the article holder 15 may be positioned at any point along the track formed by the horizontal rails 17, or the holder may be adapted for use with other types of racks or for attachment to the sides or bed of the body portion of any vehicle.

Referring to Figs. 3 and 4, it will be seen that the article holder 15 comprises holding means shown generally at 20 and a mounting member 21 for positioning the holding means 20 on the double rail 17. The mounting member 21 includes spaced horizontal plates 22 extending across the upper and lower surfaces of the rails 17, and spaced vertical plates 23 positioned adjacent to the opposed faces of the rails 17 and extending between the horizontal plates 22. The horizontal and vertical plates 22 and 23 are secured together in any suitable manner and define a central channel between the vertical plates 23 corresponding to the space between the rails 17 and an outer channel on each side of the central channel in which the rails 17 are positioned. As shown best in Fig. 3, the mounting member 21 may be constructed from sheet metal or the like, horizontal flanges 24 being provided at each end of the vertical plates 23 to which the horizontal plates 22 are secured by rivets (not shown). The horizontal plates 22 may have vertical flanges 25 formed on their outer ends, the flanges 25 abutting the outside faces of the rails 17. It is now apparent that the mounting member 21 encloses the rails 17 so that the holding means 20 will be maintained in position to engage articles 14 placed on the rails 17. The mounting member 21 is slidable on the rails 17, but fastening means may be provided for securing it in fixed position between the vertical members 16 of the rack 13, as will be described hereinafter.

The holding means 20 of the article holder 15 includes a rod-like member or shaft 28 which is slidably positioned in vertically aligned openings 29 formed in the horizontal plates 22 of the mounting member 21. The upper end portion of the shaft 28 is reduced in diameter to provide a shoulder or abutment 30, the reduced portion having a smooth periphery 31 adjacent to the abutment 30 and a threaded periphery 32 extending to the upper end of the shaft. The holding means 20 also includes a horizontally extending clamp element 33, which is rotatably positioned on the reduced portion of the shaft 28 between the abutment 30 and a nut 34 or the like secured on the threaded periphery 32 of the reduced portion. As shown in Fig. 4, the clamp 33 may extend outwardly from the shaft 28 above the rails 17 to engage articles positioned on either or both sides of the holder 15. It is apparent that different clamps 33 may be provided for different articles, but each of them must be rotatable relative to the shaft 28.

The shaft 28 is provided with a plurality of notches 35 formed in longitudinal alignment between the upper and lower ends of the shaft 28. Rachet means 36 are provided for engaging the notches 35 to prevent upward movement of the shaft 28 and clamp 33 relative to the rails 17 when an article 14 is secured therebetween. The ratchet means 36 include an elongated pawl 37 having an upper end pivotally mounted on a pin 38 extending between opposed faces of the vertical plates 23 of the mounting member 21, and a spring-like element 39 which is coiled about the pin 38 and has a loop 40 abutting the pawl 37 and ends 41 contacting another pin 42 extending between the vertical plates 23. The pawl 37 is spaced between the vertical plates 23 by washers 43 or the like whereby the pawl is positioned adjacent to the shaft 28, the lower end of the pawl being formed into a lip 44 which is biased against the shaft 28 by the spring-like element 39. Accordingly, the lip 44 of the pawl 37 may be engaged in the notches 35 of the shaft 28, or the shaft may be rotated so that the lip 44 bears against its smooth portion. Each of the notches 35 is provided with an upwardly tapered surface 45 so that the shaft 28 may be moved downwardly relative to the pawl 37 when the lip 44 bears against the notched side of the shaft. However, upward movement of the shaft 28 is effectively prevented by the engagement of the lip 44 in the bottom of the notches 35.

In use, the articles to be secured are positioned on the racks 13 with the clamp 33 of the article holder 15 positioned thereabove. The clamp 33 is then pivoted over the article 14 and the shaft 28 grasped and pulled downwardly so that the pawl 37 rides over the tapered surfaces 45 of the notches 35. When the article 14 is firmly secured between the clamp 33 and the rails 17, the pawl lip 44 will come to rest in one of the notches 35 thereby preventing upward movement of the shaft 28 so that the article 14 is firmly locked on the racks 13. A handle 47 or the like (Fig. 1) may be provided on the lower end of the shaft 28 to facilitate easier control of the shaft.

When it is desired to release the clamp 33 so that the article 14 may be removed from the racks 13, the shaft 28 is rotated so that the pawl 37 bears against a smooth portion of the shaft away from the notches 35 whereby the shaft 28 and clamp 33 may be easily raised. Inasmuch as the clamp 33 is rotatably mounted on the upper end of the shaft 28, the clamp will remain in position over the article 14 until the shaft 28 is raised.

It is apparent that when an article 14 is secured between the clamp 33 and the rails 17, the frictional engagement therebetween will prevent lateral movement of the holder 15 on the rack 13. However, the vertical flanges 25 of the horizontal plates 22 and the rails 17 may be provided with threaded openings 48 into which capscrews 49 or the like may be tightened for securing the locking means 20 in fixed position on the rack 13.

Referring to Fig. 5, it will be seen that the mounting member 21 may be cast in two sections which may be tapped, as at 50, for receiving capscrews 51 therein. Accordingly, the mounting member 21 may be easily removed from the rails 17.

It is now apparent that a simple, rugged and economical article holder 15 has been provided for quickly and easily securing articles to a truck rack 13 or the like. It is also obvious that the clamp 33 may be raised to different heights above the rails 17 to accommodate articles of different thicknesses and widths therebetween. In addition, it is within the scope of the prevent invention to provide clamps 33 of different shapes for various articles.

Still other changes and modifications readily apparent to all those skilled in the art are contemplated as within the scope of the present invention, which is limited only by the claims which follow.

What I claim is:

1. An article holder adapted to releasably secure articles on a horizontal rack, said article holder comprising a mounting member positioned on the rack, a cylindrical shaft carried by said mounting member and vertically adjustable relative thereto, said shaft having a plurality of longitudinally aligned notches formed therein, a horizontally extending clamping member rotatably attached to said shaft above said mounting member and vertically adjustable therewith for securing articles on the rack, and ratchet means engageable in the notches of said shaft for releasably maintaining said clamping member in article securing position, said shaft being rotatable relative to said clamping member to move the notches out of engagement with said ratchet means to permit vertical sliding movement of said shaft for carrying said clamping member toward and away from article securing position.

2. In combination with a truck rack including a horizontal rail member for carrying articles; a holder for securing said articles to said rail member, comprising a mounting member positioned on said rail member, rod-like means carried by said mounting member and vertically movable relative to said rail member, clamping means rotatably mounted on said rod-like means above said rail member and vertically movable with said rod-like means for securing an article to said rail member, and ratchet means releasably engageable with said rod-like means for preventing upward movement of said clamping means relative to said rail member when an article is secured therebetween.

3. The combination according to claim 2 wherein means are provided for securing said mounting member in fixed position on said rail member.

4. The combination according to claim 2 wherein two horizontal rails in fixed spaced relation are provided, and said mounting member includes horizontal and vertical brackets enclosing said rails.

5. The combination according to claim 4 wherein said rod-like means comprises a cylindrical shaft slidably positioned between said rail members in vertically aligned openings in said horizontal brackets of said mounting member.

References Cited in the file of this patent

UNITED STATES PATENTS

| | | |
|---|---|---|
| 300,780 | Johnson | June 24, 1884 |
| 921,815 | Erlandsson | May 18, 1909 |
| 1,193,336 | Adams | Aug. 1, 1916 |
| 1,869,284 | Swanson | July 26, 1932 |
| 2,237,853 | Troche | Apr. 8, 1941 |
| 2,746,628 | Meyra | May 22, 1956 |

FOREIGN PATENTS

| | | |
|---|---|---|
| 818,008 | Germany | Oct. 22, 1951 |